3,341,425
NUCLEAR REACTOR WITH IMPROVED
MODERATOR MATERIAL
Ju Chin Chu, Garden City, N.Y.,
(1928 Taft Ave., Hollywood, Calif. 90028)
No Drawing. Filed Apr. 28, 1964, Ser. No. 363,273
22 Claims. (Cl. 176—41)

This invention relates in general to nuclear reactors and, more particularly, to an improved material for use in nuclear reactor fuel elements, and the like. The invention is uniquely adapted for use in nuclear propulsion of aircraft.

In the development of thermal nuclear reactors, one of the most difficult engineering problems has been, and remains, the selection of the best material for use as a moderator and matrix. Any such material must possess not only a low thermal neutron cross-section, but also a number of other properties which are at least in part dependent on the particular reactor design involved. Thus, the material must be stable at the temperature of operation of the reactor; it must not be corroded or affected in any other way by the cooling medium of the reactor, whether this be gas, boiling water at high pressure, or an organic fluid; and it must have structural properties sufficient to withstand the physical stresses present when the reactor is in operation.

In the case of reactors fueled with uranium or plutonium alloys, it is necessary to jacket the fuel with a material which is strong enough to withstand the pressures generated by both the well-known dimensional instability of these alloys, and the gaseous fission products generated within the fuel. Because of these very difficult problems, investigators have turned increasing attention to the so-called ceramic fuel elements which employ uranium oxide as the fissionable material. The advantage of a uranium oxide fuel element is that it possesses dimensional stability and corrosion resistance, which eliminates the need for jacketing. It has a melting point of 2176° C., as opposed to 1150° C. for pure uranium. While the melting point of metallic elements is not critical per se, it is indicative of recrystallization temperature and other parameters which can adversely affect fuel element life.

In the fabrication of uranium oxide fuel elements it is necessary to disperse the active fuel material within a suitable matrix. This is, ideally, a moderator-type material possessing a low thermal neutron cross-section, refractory properties at least equivalent to the uranium oxide, and chemical stability within the cooling medium at operating temperatures. A material which seemingly meets these stringent requirements is beryllia (BeO). It is an ideal moderator; is more refractory than uranium oxide (melting point 2570° C.); and is very stable. Its one drawback is that, when operating at high temperatures over prolonged periods, it reacts with water vapor in air, forming highly volatile beryllium hydroxide according to the following equation:

$$BeO + H_2O \rightarrow Be(OH)_2 \qquad (1)$$

When air containing moisture is passed through the reactor tubes, the beryllium hydroxide formed in the core area of the reactor, where temperatures are highest, is immediately carried away from the core. At lower temperatures the reverse of Equation 1 takes place, and beryllia is deposited. The net effect is that of a mass transfer of beryllia which can completely plug the reactor. This is particularly true with reactors designed for nuclear propulsion of aircraft. These reactors contain a large number of small tubes through which air passes, is heated, and expelled. Mass transfer of beryllium hydroxide from the hot end to the cold end of these tubes would soon plug the tubes, causing failure of the mission. It is to be noted that this is not the sort of trouble which is curable by merely replacing a fuel rod while the reactor is operating, but requires a complete shutdown for the replacement of fuel and tubes.

It is the object of this invention to prevent the progress of Equation 1 to the right, but at the same time to in no way alter the desirable properties of beryllia as a moderator. I have found that the mass transfer of beryllia under the conditions described may be completely eliminated by incorporating small amounts of chromium, zirconium, titanium, or their oxides into the beryllia in the form of a solid solution. Neither of these refractory metals, nor their oxides, in any way detracts from the desirable properties of the beryllia itself; yet they prevent any reaction between the beryllia and water vapor, thereby eliminating any possibility of mass transfer during reactor operation. While there is no particular upper limit to the quantities of these materials which may be added to the beryllia, it is of course advantageous for economic reasons to keep additions as small as possible. In particular, I have found that chromium is successful in performing this function when added to the beryllia in amounts of from 0.1 to 16.7 atomic percent chromium in the final solid. Titanium and zirconium, on the other hand, is effective over the range of 0.1 to 11.11 atomic percent. Additions of oxide should also preferably fall in the same ranges for the percent of the metal in the final solid.

As another alternative embodiment of my invention, the oxides of chromium and titanium can be mixed and added to the beryllia as such.

It is believed that a more complete understanding of the nature of my invention will be gained by referring to the following examples setting forth specific embodiments thereof.

EXAMPLE I

Three equal samples of beryllium oxide powder of high purity were prepared. The first sample was intimately admixed with 10 atomic percent of micron-sized chromium powder, and the second sample was similarly mixed with 10 atomic percent of equally finely-divided titanium; and the third sample was similarly mixed with 11 atomic percent of zirconium. The fourth sample was not treated. Slips were prepared of all three samples and each was cast as a porous plug approximately 1-inch in diameter, by well-known slip-casting techniques. The slips were dried in warm, dry air, and then fired at 2550° C., to insure a true solid-solution, or compound formation, of the tianium, zirconium, and chromium. The plugs were then fitted into alundum tubes and moist air at a temperature of 1371° C., and a pressure of 15 p.s.i., was passed through the plugs for a period of 24 hours. The plugs were cooled slowly in a dry atmosphere, and weighed. It was found that the untreated plug had lost approximately 10% of its total weight, but that the plugs having chromium and titanium additions lost no measurable weight.

EXAMPLE II

The procedure of Example I was repeated, using high-pressure steam (150 p.s.i.) at a temperature of 185° C. Again, the titanium- and chromium-containing plugs lost no measurable weight, whereas the untreated plug lost approximately 80%.

EXAMPLE III

Three high purity beryllia tubes were fabricated. The inside of one tube was chromized with an approximate mono-molecular layer of high-purity chromium; and a second tube was similarly treated with titanium. The third tube was untreated. Tests similar to those in Examples I and II were then performed. In both cases the treated tubes showed no loss of weight, whereas the untreated tube lost 8% of its weight in moist air, and 70% in high pressure steam.

The effluent moist air from the untreated tube used above was passed through a cold trap, and a subsequent analysis showed the presence of beryllia deposited therein.

EXAMPLE IV

Tests similar to those carried out in Examples I and II were performed, using varying percentages of chromium, zirconium, and titanium. It was found that chromium was effective in preventing reaction between the beryllia and water vapor when present in concentrations over 0.1 atomic percent, but that no additional improvement was made at concentrations over 16.7 atomic percent. Similarly, titanium and zirconium were effective over one atomic percent, but no additional improvement was made at concentrations over 11.11 atomic percent.

EXAMPLE V

Tests similar to those carried out in Examples I and II were performed with the oxides of chromium, zirconium, and titanium, rather than the metal. It was found that the titania and chromic oxide plugs were just as effective at preventing beryllia hydrolysis as were the plugs containing the metal. While not wishing that my invention be tied to any particular theory, it is believed that under operating conditions of high temperature, pressure, and corrosive atmosphere, the metal additions oxidize at least in part, so that in this respect additions of metal or oxide are equivalent.

Having thus described the subject matter of my invention, what it is desired to secure by Letters Patent, is:

1. A fuel element intended for use in a thermal nuclear reactor that comprises a fissonable component and a matrix component, said matrix component consisting essentially of a solid solution of beryllium oxide and at least one-tenth atomic percent of a material selected from the group consisting of chromium, zirconium, titanium, chromium oxide, zirconium oxide, and titanium oxide.

2. A fuel element as claimed in claim 1, wherein said matrix component is a complex compound.

3. A fuel element intended for use in a thermal nuclear reactor that comprises a fissionable component and a matrix component, said matrix component consisting essentially of a solid solution of beryllium oxide and at least one-tenth atomic percent of a material selected from the group consisting of a mixture of chromium, zirconium, and titanium oxides, and a mixture of chromium, zirconium, and titanium metal.

4. A fuel element as claimed in claim 3, wherein said matrix component is a complex compound.

5. In a thermal nuclear reactor, a solid solution moderator consisting essentially of a major portion of beryllium oxide, and at least one-tenth atomic percent of a material selected from the group consisting of zirconium, chromium, titanium, chromium oxide, zirconium oxide, and titanium oxide.

6. In a thermal nuclear reactor, a moderator as claimed in claim 5, wherein said moderator is a complex compound.

7. In a thermal nuclear reactor, a solid solution moderator consisting essentially of a major portion of beryllium oxide, and at least one-tenth atomic percent of a material selected from the group consisting of a mixture of chromium, zirconium, and titanium oxides, and a mixture of chromium, zirconium, and titanium metal.

8. In a thermal nuclear reactor, a moderator as claimed in claim 7, wherein said moderator is a complex compound.

9. In a thermal nuclear reactor comprising a reactor vessel, fissionable material, matrix and moderator material in operable arrangement within said vessel, and means capable of passing a cooling medium through said vessel, said moderator and matrix material consisting essentially of a solid solution of a major portion of beryllium oxide and at least one-tenth atomic percent of a material selected from the group consisting of chromium, zirconium, titanium, chromium oxide, zirconium oxide, and titanium oxide.

10. In a thermal nuclear reactor as in claim 9, the improvement wherein said matrix and moderator material is a complex compound.

11. In a thermal nuclear reactor comprising a reactor vessel, fissionable material, matrix and moderator material in operable arrangement within said vessel, and means capable of passing a propulsion medium through said vessel, said moderator and matrix material consisting essentially of a composition selected from the group consisting of solid solutions and complex compounds, of beryllium oxide and from 0.1 to 16.7 atomic percent chromium.

12. In a thermal nuclear reactor as in claim 11, the improvement wherein said matrix and moderator material is a complex compound.

13. In a thermal nuclear reactor as claimed in claim 11, the improvement wherein said chromium is added as chromium oxide.

14. In a thermal nuclear reactor as in claim 13, the improvement wherein said matrix and moderator material is a complex compound.

15. In a thermal nuclear reactor comprising a reactor vessel, fissionable material and moderator material in operable arrangement within said vessel, and means capable of passing a propulsion medium through said vessel, said moderator and matrix material consisting essentially of a solid solution of beryllium oxide and from 1 to 11.11 atomic percent titanium.

16. In a thermal nuclear reactor as in claim 15, the improvement wherein said matrix and moderator material is a complex compound.

17. In a thermal nuclear reactor as claimed in claim 15, the improvement wherein said titanium is added as titanium oxide.

18. In a thermal nuclear reactor as claimed in claim 16, the improvement wherein said titanium is added as titanium oxide.

19. In a thermal nuclear reactor as claimed in claim 15, the improvement wherein titanium is replaced by zirconium.

20. In a thermal nuclear reactor as claimed in claim 16, the improvement wherein titanium is replaced by zirconium.

21. In a thermal nuclear reactor as claimed in claim 17, the improvement wherein titanium is replaced by zirconium.

22. In a thermal nuclear reactor as claimed in claim 18, the improvement wherein titanium is replaced by zirconium.

References Cited

UNITED STATES PATENTS

| | | | |
|---|---|---|---|
| 3,150,054 | 9/1964 | Fox | 176—36 X |
| 3,202,582 | 8/1965 | Rom | 176—39 X |
| 3,165,417 | 1/1965 | Turner | 106—66 X |
| 3,150,099 | 9/1964 | Pons | 176—89 |

OTHER REFERENCES

Reactor Handbook, second edition, vol. I, Materials, edited by C. R. Tipton, Interscience Publishers Inc., 1960, New York, (pp. 934–939).

Reactor Materials, August 1962, vol. 5, No. 3, pp. 25–28.

Reactor Core Materials, February 1960, vol. 3, No. 1, pp. 11, 12.

Journal of the American Ceramic Society, vol. 44, No. 6, June 1961, pp. 251–255.

REUBEN EPSTEIN, *Primary Examiner.*